Jan. 7, 1969

D. J. BOOTY 3,419,989

SCENE IN MOTION

Filed March 28, 1966

INVENTOR
Donald J. Booty
BY
Merriam, Marshall, Shapiro & Klose
ATTORNEYS

United States Patent Office 3,419,989

Patented Jan. 7, 1969

3,419,989

SCENE IN MOTION

Donald J. Booty, Oak Forest, Ill., assignor to Spartus Corporation, Chicago, Ill., a corporation of Illinois Filed Mar. 28, 1966, Ser. No. 537,872
U.S. Cl. 40—160 4 Claims
Int. Cl. G09f *19/02;* G09f *1/12*

ABSTRACT OF THE DISCLOSURE

Picture including picture canvas surrounded by frame and having clock face painted thereon as part of scene. Opening in picture canvas, at clock face, through which extends rotatable shaft from clock movement located behind picture canvas. Clock movement detachably supported behind picture canvas by structure located entirely behind picture canvas and including fasteners movable independently of picture and of shaft. Clock hands on shaft in front of picture canvas cooperate with clock face on picture canvas to tell the time of day.

The present invention relates generally to a pictorial device having movable parts, and more particularly to a scene, parts of which are in motion.

Basically, the scene in motion includes picture means having picture canvas means with a scene thereon. The scene on the picture canvas means, which is typically enclosed within picture frame means, includes a clock face; and the picture canvas means has an opening therein at the clock face in the scene. Located behind the picture canvas means is a clock movement and extending from the clock movement through the opening in the picture canvas means is rotatable shaft means drivably connected to the clock movement. Located in front of the picture canvas means are a pair of clock hands each mounted on the shaft means for rotation of the clock hands. The clock hands and the clock face in the scene cooperate for indicating the time of day. The clock movement is mounted on the picture means by mounting structure located entirely behind the picture canvas means so as to not interfere with the scene which is viewed from the front of the picture canvas means.

The term "picture canvas means" is used herein in a functional sense rather than in a composition sense. Thus, the picture canvas means may be of a material other than canvas, and the material may be either flexible or rigid. The important consideration is that it present the appearance of and serve the function of a picture canvas so that a scene may be painted, lithographed or otherwise produced or reproduced on the front of the picture canvas means.

Similarly, the picture frame means may be an actual picture frame or it may be structural means which presents the appearance of and serves the function of the picture frame. The picture frame means may be composed of wood, plastic, metal or any other material so long as the appearance and function thereof is that of a picture frame, located around the border or periphery of the picture canvas means.

In a preferred embodiment, the scene in motion is embodied in what appears to be an oil painting having a peripheral picture frame, a picture canvas located within the picture frame and a scene on the picture canvas; and the scene includes a clock face with movable clock hands located in front of the clock face and cooperating with the clock face to indicate the time of the day.

Figure 1:
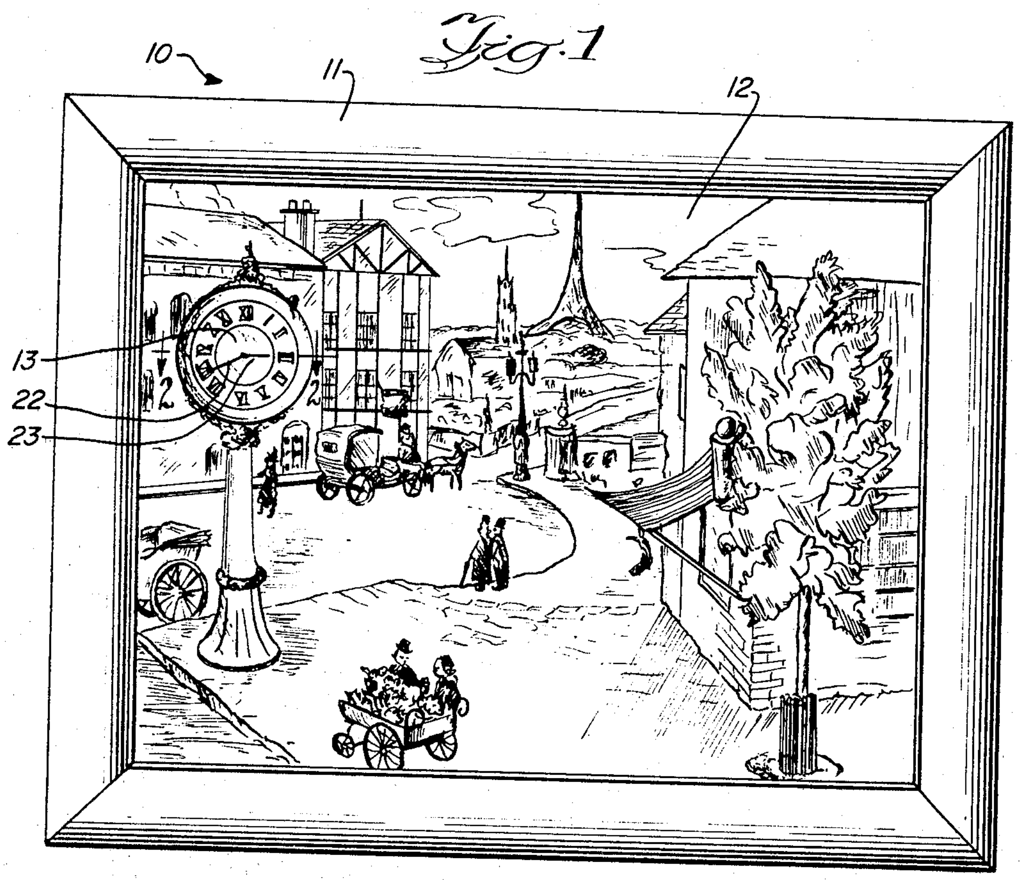
Figure 2:
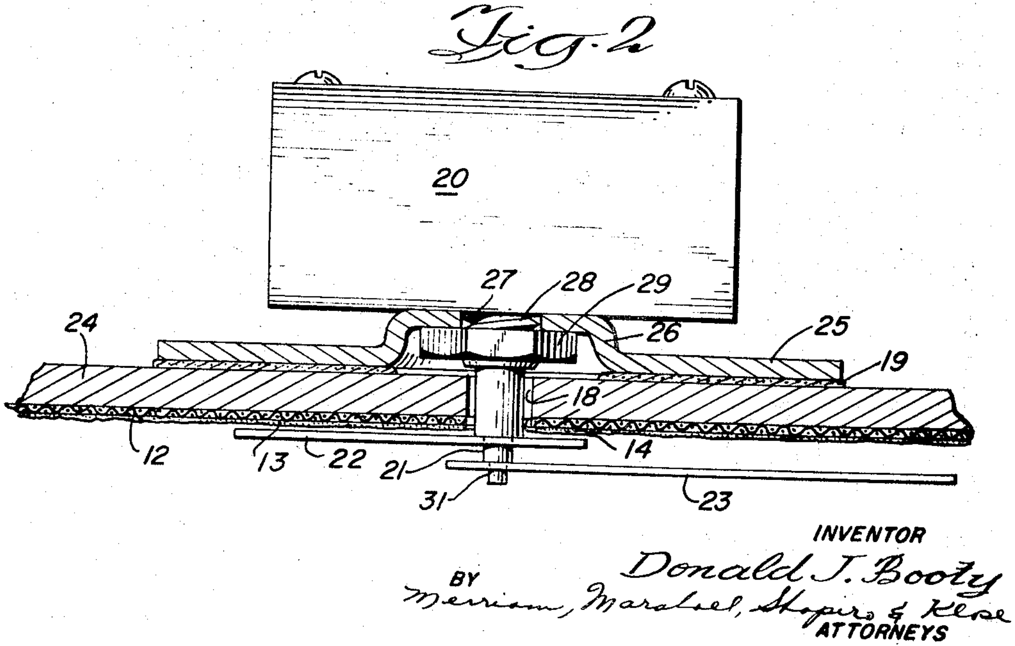

Other features and advantages are inherent in the structure claimed and disclosed or will become apparent to those skilled in the art from the following detailed description in conjunction with the accompanying drawings wherein:

FIGURE 1 is a front view of an embodiment of a scene in motion constructed in accordance with the present invention; and FIGURE 2 is a sectional view taken along lines 2—2 in FIGURE 1.

Referring to FIGURES 1 and 2, there is shown a preferred embodiment of a scene in motion constructed in accordance with the present invention and comprising picture means indicated generally at 10. Picture means 10 includes peripheral picture frame means 11 and picture canvas means 12 located within the picture frame means. Painted on the front surface of the picture canvas means is a scene, in the illustrated embodiment having an outdoor Parisian setting, and the scene includes a clock face 13. As shown in FIGURE 2, picture canvas means 12 has an opening 14 located in the center of clock face 13.

Located behind picture canvas means 12 is a casing 20 containing a clock movement typically driven by electric motor means powered by batteries, all of which would be within casing 20. The entire clock movement as well as the driving and power elements therefor are located behind the picture canvas means and are detachably mounted on the picture means by structure to be subsequently described.

Drivably connected to the clock movement and extending therefrom through the opening 14 in picture canvas means 12 is rotatable shaft means comprising a pair of coaxial shafts 21, 31. Mounted on respective shafts 21, 31 are a pair of clock hands 22, 23. The clock hands rotate with the shaft means in a conventional manner. Clock hands 22, 23 and clock face 13 in the scene on the front surface of picture canvas means 12 cooperate for indicating the time of day.

In the illustrated embodiment, located behind at least that portion of picture canvas means 12 on which clock face 13 is painted, is a rigid planar member 24 which may be attached at opposite ends thereof to picture frame means 11, or the picture canvas means may be adhesively bonded to planar member 24. In other embodiments the totality of the picture canvas means may be in the form of a rigid planar member and the scene would be on the front surface of the rigid planar member.

Planar member 24 has an opening 18 concentric with the axes of shafts 21, 31. Mounted on the back surface of planar member 24, e.g., by suitable adhesive 19 (or by fasteners), is a mounting member 25 having an offset portion 26 with an opening 27 concentric with the axes of shafts 21, 31. Extending through opening 27 is an externally threaded shank 28 attached to the clock movement casing 20 and coaxial with shafts 21, 31, but not rotatable therewith. Threadedly engaged around shank 28 is a nut 29 located in the offset portion 26 of mounting member 25.

Mounting member 25, shank 28 and nut 29 cooperate to detachably mount the clock movement, and other elements within casing 20, behind picture means 10. The totality of the mounting structure is located behind the picture canvas means 12 so that it is not visible to one who views the scene on the front surface of picture canvas means 12. Thus, opening 14 in picture canvas means 12 need only be of a size which accommodates the shaft means and may be smaller in diameter than shank 28 and nut 29.

The mounting structure, elements 25, 28 and 29, as well as planar member 24 are sized to support the clock movement and such driving and power elements as are associated therewith in casing 20. Because of this, nut 29 and shank 28, or at least nut 29, are of a size which is disproportionately too large in comparison to the scene on the front of picture canvas means 12. Accordingly, it is important that nut 29, and preferably shank 28, are both located, in totality, behind picture canvas means 12. When movable nut 29 is tightened, the clock movement is attached in the supported position of FIG. 2; and movable nut 29 may be loosened to detach the clock movement from its supported position.

The path traveled by any point on a clock hand 22 or 23 defines a circle lying in a plane parallel to the front surface of the picture canvas 12. On a two dimensional surface containing a scene which appears to have three dimensions, a circle in such a scene appears to lie in a plane parallel to the plane of the front surface of the picture canvas. (If a circle is to appear to lie in a plane angular to the plane of the front surface of the picture canvas, it must be drawn in some other shape, such as an ellipse.) In the scene in motion of the present invention, the clock face is drawn so that it appears to lie in a plane parallel to the plane of the front surface of the picture canvas, because the plane of the clock face must be parallel to the plane of the circular path along which a clock hand moves. Thus, in the scene shown in FIGURE 1, clock face 13 is defined by a circle rather than by some other shape.

The foregoing detailed description has been given for clearness of understanding only, and no unnecessary limitations should be understood therefrom, as modifications will be obvious to those skilled in the art.

What is claimed is:

1. A scene in motion comprising:
picture means including peripheral picture frame means and picture canvas means within said picture frame means;
said picture canvas means having a scene thereon including a clock face in said scene;
an opening in said picture canvas means, said opening being located in said clock face in said scene;
clock movement means located behind said picture canvas means;
rotatable shaft means drivably connected to said clock movement means and extending through said opening in the picture canvas means;
means, located in totality behind the picture means, for detachably supporting the clock movement means on the picture means behind said picture canvas means, said supporting means comprising a mounting member having a flat portion permanently secured to the back of said picture means and having an offset portion spaced from the back of said picture means, said offset portion having an opening aligned with said first mentioned opening;
said supporting means including fastener means located in the space between said offset portion and said picture means, said fastening means engageable with means on said clock movement means extending into said opening in said offset portion, said fastening means being movable for attachment and detachment of the clock movement means in a supported position and movable independently of the picture means and of said rotatable shaft means;
and a pair of clock hands located in front of said picture canvas means and mounted on said shaft means for rotation of said clock hands;
whereby the clock hands and the clock face in said scene cooperate for indicating the time of day.

2. A scene in motion as recited in claim 1 wherein:
said means on the clock movement means which extends into said opening in said offset portion comprising an externally threaded shank extending from said clock movement means, coaxial with said shaft means and fixed against rotation;
said fastener means comprising an internally threaded nut rotatably engaged around said shank;
said nut having a width greater than that of said opening in said picture canvas means.

3. A scene in motion as recited in claim 2 wherein:
said shank has a diameter greater than the diameter of the opening in said picture canvas means;
and the totality of said shank is located behind said picture canvas means.

4. A scene in motion as recited in claim 1 wherein:
said movable fastener means is rotatably engageable and disengageable;
and the axis of rotation of said fastener means extends in the same direction as the axis of said shaft means.

References Cited

UNITED STATES PATENTS

| | | | |
|---|---|---|---|
| 620,868 | 3/1899 | Goebler | 40—126 |
| 1,035,418 | 8/1912 | Chouffet. | |
| 1,045,637 | 11/1912 | Taylor | 40—33 |

FOREIGN PATENTS

| | | |
|---|---|---|
| 1,421,065 | 11/1965 | France. |
| 1,030,464 | 5/1966 | Great Britain. |
| 94,781 | 4/1922 | Switzerland. |

EUGENE R. CAPOZIO, *Primary Examiner.*

RICHARD CARTER, *Assistant Examiner.*

U.S. Cl. X.R.

40—126; 58—127